US012154432B2

(12) United States Patent
Yu et al.

(10) Patent No.: US 12,154,432 B2
(45) Date of Patent: Nov. 26, 2024

(54) SMART NOTIFICATIONS FOR GARAGE PARKING COLLISION AVOIDANCE

(71) Applicant: GM Global Technology Operations LLC, Detroit, MI (US)

(72) Inventors: Bo Yu, Troy, MI (US); Brent Navin Roger Bacchus, Sterling Heights, MI (US); Jiabin Shen, Burnaby (CA); Yuan Zhang, Shanghai (CN); Wenyuan Qi, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 56 days.

(21) Appl. No.: 18/181,041

(22) Filed: Mar. 9, 2023

(65) Prior Publication Data

US 2024/0290206 A1 Aug. 29, 2024

(30) Foreign Application Priority Data

Feb. 23, 2023 (CN) ......................... 202310162160.5

(51) Int. Cl.
*G08G 1/14* (2006.01)
*G08G 1/16* (2006.01)

(52) U.S. Cl.
CPC ............. *G08G 1/146* (2013.01); *G08G 1/143* (2013.01); *G08G 1/164* (2013.01)

(58) Field of Classification Search
CPC ......... G08G 1/146; G08G 1/143; G08G 1/164
See application file for complete search history.

(56) References Cited

U.S. PATENT DOCUMENTS

| | | | | |
|---|---|---|---|---|
| 8,350,724 | B2 * | 1/2013 | Szczerba | G01S 13/931 340/932.2 |
| 2014/0350855 | A1 * | 11/2014 | Vishnuvajhala | G07C 1/30 701/538 |
| 2021/0192952 | A1 * | 6/2021 | Silas | H04W 4/021 |
| 2023/0118743 | A1 * | 4/2023 | Patel | G06Q 10/02 705/5 |
| 2023/0168094 | A1 * | 6/2023 | Beaurepaire | G01C 21/3697 701/425 |

FOREIGN PATENT DOCUMENTS

| | | | |
|---|---|---|---|
| DE | 102015000399 | A1 | 7/2016 |
| DE | 102015207804 | A1 | 11/2016 |
| DE | 102015212027 | A1 | 12/2016 |

(Continued)

*Primary Examiner* — An T Nguyen
(74) *Attorney, Agent, or Firm* — Vivacqua Crane, PLLC

(57) ABSTRACT

A method for generating garage parking notifications includes receiving current parked-vehicle data indicating that a vehicle has been parked inside a garage. The current parked-vehicle data includes the current location of the vehicle parked inside the garage. The method further includes determining whether the current location of the vehicle inside the garage is within a warning zone. The warning zone is an area inside the garage where the vehicle has not been frequently parked. The warning zone area is determined using historical parked-vehicle data. The method further includes generating a notification to warn an operator of the vehicle that the vehicle should be moved in response to determining that the current location of the vehicle inside the garage is within the warning zone.

8 Claims, 2 Drawing Sheets

(56) References Cited

FOREIGN PATENT DOCUMENTS

| | | | |
|---|---|---|---|
| DE | 102016004292 | A1 | 2/2017 |
| DE | 102017216237 | A1 | 3/2019 |
| DE | 102018211941 | A1 | 1/2020 |
| DE | 102021104208 | A1 | 9/2021 |
| DE | 102021200115 | A1 | 7/2022 |
| DE | 102021116403 | A1 | 12/2022 |

* cited by examiner

SMART NOTIFICATIONS FOR GARAGE PARKING COLLISION AVOIDANCE

The present disclosure relates to systems and methods for providing smart notifications to avoid collisions in a parking garage.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, vehicles are frequently parked inside parking garages. Parking garages sometimes are tight environments. Ideally, the vehicle operators park inside the parking garages while avoiding collisions.

SUMMARY

In an aspect of the present disclosure, a method for generating garage parking notifications includes receiving current parked-vehicle data indicating that a vehicle has been parked inside a garage. The current parked-vehicle data includes the current location of the vehicle parked inside the garage. The method further includes determining whether the current location of the vehicle inside the garage is within a warning zone. The warning zone is an area inside the garage where the vehicle has not been frequently parked. The warning zone is determined using crowdsourced historical parked-vehicle data. The method further includes generating a notification to warn an operator of the vehicle that the vehicle should be moved in response to determining that the current location of the vehicle inside the garage is within the warning zone. The method described in this paragraph improves vehicle technology by providing a notification to a vehicle operator before a collision occurs inside a parking garage without relying on real-time data from sensors and/or costly mapping of parking garages.

In an aspect of the present disclosure, the method further includes determining that the vehicle has moved within the garage after generating the notification to warn an operator of the vehicle, determining a new parked location of the vehicle inside the garage after the vehicle has moved; and saving the new parked location of the vehicle.

In an aspect of the present disclosure, the method includes determining the warning zone using the historical parked-vehicle data. The historical parked-vehicle data includes information about where the vehicle has been historically parked inside the garage.

In an aspect of the present disclosure, determining the warning zone includes receiving the historical parked-vehicle data. The historical parked-vehicle data includes a plurality of historical parked locations inside the garage. Further, determining the warning zone includes clustering the plurality of historical parked locations inside the garage to generate a cluster.

In an aspect of the present disclosure, determining the warning zone includes applying a Kernel Density Estimation (KDE) to the cluster to generate a probability distribution.

In an aspect of the present disclosure, determining the warning zone includes using a cumulative distribution function to determine the warning zone.

In an aspect of the present disclosure, the method further includes virtually displaying a graphical representation of a location outside the warning zone on a heads-up display.

The present disclosure also describes a tangible, non-transitory, machine-readable medium, including machine-readable instructions, that when executed by one or more processors, cause one or more processors to execute the methods described above.

In an aspect of the present disclosure, the tangible, non-transitory, machine-readable medium further includes machine-readable instructions, that when executed by the processor, causes the processor to: determine that the vehicle has moved within the garage after generating the notification to warn the vehicle operator of the vehicle; determine a new parked location of the vehicle inside the garage after the vehicle has moved; and save the new parked location of the vehicle.

In an aspect of the present disclosure, the tangible, non-transitory, machine-readable medium further includes machine-readable instructions, that when executed by the processor, causes the processor to: determine the warning zone using the historical parked-vehicle data, wherein the historical parked-vehicle data includes information about where the vehicle has been parked inside the garage.

In an aspect of the present disclosure, the tangible, non-transitory further includes machine-readable instructions, that when executed by the processor, causes the processor to: receive the historical parked-vehicle data, wherein the historical parked-vehicle data includes a plurality of historical parked locations inside the garage; and cluster the plurality of historical parked locations inside the garage to generate a cluster.

In an aspect of the present disclosure, the tangible, non-transitory, machine-readable medium of further includes machine-readable instructions, that when executed by the processor, causes the processor to apply a Kernel Density Estimation (KDE) to the cluster to generate a probability distribution.

In an aspect of the present disclosure, the tangible, non-transitory further includes machine-readable instructions, that when executed by the processor, causes the processor to use a cumulative distribution function to determine the warning zone.

In an aspect of the present disclosure, the tangible, non-transitory further includes machine-readable instructions, that when executed by the processor, causes the processor to command a heads-up display to virtually display a graphical representation of a location outside warning zone.

The present disclosure also describes a system including a sensor and a controller in communication with the sensor. The controller is programmed to: receive current parked-vehicle data from the sensor, wherein the current parked-vehicle data indicates that a vehicle has been parked inside a garage, and the current parked-vehicle data includes a current location of the vehicle inside the garage; determine whether the current location of the vehicle inside the garage is within a warning zone, wherein the warning zone is an area inside the garage where the vehicle has not been frequently parked, and the warning zone is determined using historical parked-vehicle data; and in response to determining that the current location of the vehicle inside the garage is within the warning zone, generate an notification to warn a vehicle operator of the vehicle that the vehicle should be moved.

In an aspect of the present disclosure, the controller is programmed to: determine that the vehicle has moved within the garage after generating the notification to warn the vehicle operator of the vehicle; determine a new parked location of the vehicle inside the garage after the vehicle has moved; and save the new parked location of the vehicle.

In an aspect of the present disclosure, the controller is programmed to determine the warning zone using the historical parked-vehicle data, wherein the historical parked-vehicle data includes information about where the vehicle has been parked inside the garage.

In an aspect of the present disclosure, the controller is programmed to: receive the historical parked-vehicle data, wherein the historical parked-vehicle data includes a plurality of historical parked locations inside the garage; and cluster the plurality of historical parked locations inside the garage to generate a cluster.

In an aspect of the present disclosure, the controller is programmed to apply a Kernel Density Estimation (KDE) to the cluster to generate a probability distribution.

In an aspect of the present disclosure, the controller is programmed to use a cumulative distribution function to determine the warning zone.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
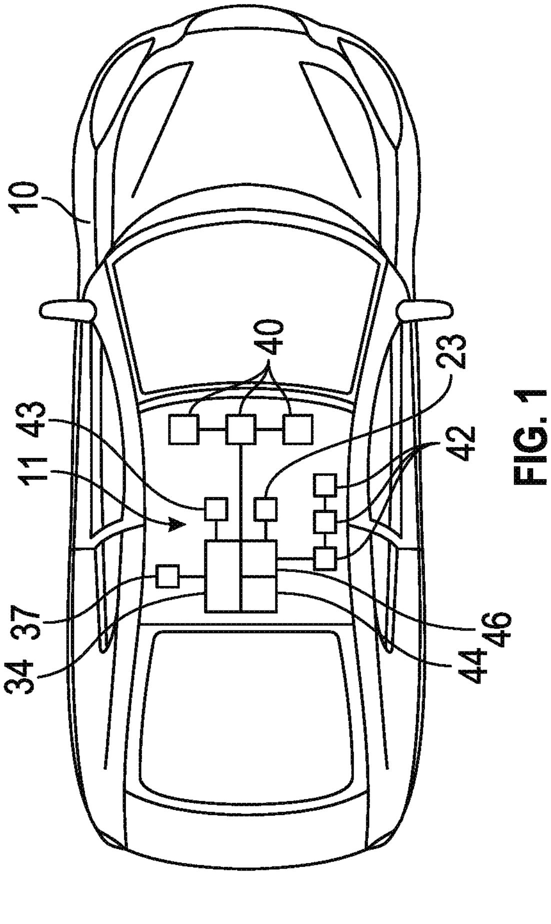
FIG. 1 is a schematic top view of a vehicle including a system for providing smart notifications to avoid collisions in a parking garage.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 includes (or is in communication with) a system 11 for providing smart notifications to avoid collisions in a parking garage. As non-limiting examples, a notification includes visual notification, audible notification, haptic notification, etc. While the system 11 is shown inside the vehicle 10, it is contemplated that the system 11 may be outside of the vehicle 10. As a non-limiting example, the system 11 may be in wireless communication with the vehicle 10. Although the vehicle 10 is shown as a sedan, it is envisioned that that vehicle 10 may be another type of vehicle, such as a pickup truck, a coupe, a sport utility vehicle (SUVs), a recreational vehicle (RVs), etc.

The vehicle 10 includes a head-up display (HUD) 43 in communication with the controller 34. The HUD 43 is in communication with the controller 34. Accordingly, the HUD 43 may receive commands from the controller 34. During use, the HUD 43 is configured to generate and display one or more graphic indicative of an ideal parking location inside the garage.

The vehicle 10 includes a controller 34 and one or more sensors 40 in communication with the controller 34. The sensors 40 collect information and generate sensor data indicative of the collected information. As non-limiting examples, the sensors 40 may include Global Navigation Satellite System (GNSS) transceivers or receivers, yaw rate sensors, speed sensors, lidars, radars, ultrasonic sensors, and cameras, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The ultrasonic sensor may detect static and/or dynamic objects. At least one of the sensors 40 is configured to determine the current location of the vehicle 10. As non-limiting examples, this sensor 40 may be a vehicle location sensor, such as a GPS tracker.

The system 11 further includes the controller 34, which is in communication with the sensors 40. Accordingly, the controller 34 is programmed to receive sensor data from the sensors 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

Figure 3:
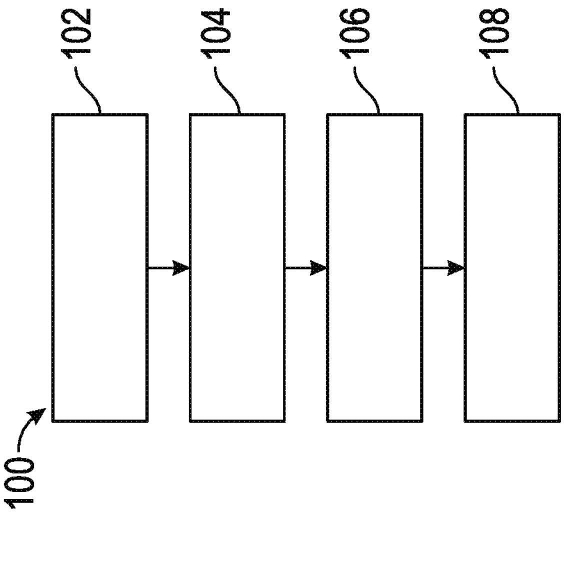
FIG. 3 is a flowchart of a method for creating a statistical representation of where the vehicle of FIG. 1 is historically and properly parked inside the parking garage of FIG. 2.
Figure 7:
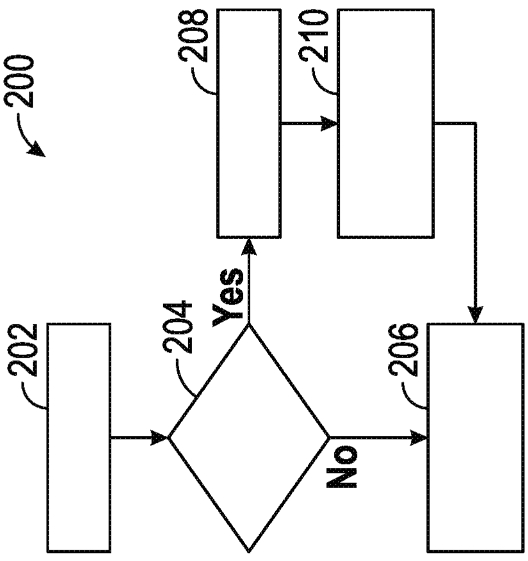
FIG. 7 is a method for providing smart notifications to avoid collisions in a parking garage.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators 42 to automatically control the components of the vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 3), that when executed by the one or more processors, cause the processors 44 to execute the method 100 (FIG. 3) and/or method 200 (FIG. 7).

The vehicle 10 includes a user interface 23 in communication with the controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification to the vehicle user of the vehicle 10. The user interface 23 is in electronic communication with the controller 34 and is configured to receive inputs from a vehicle user (e.g., a vehicle user or a vehicle passenger). For example, the user interface 23 may include a touch screen and/or buttons configured to receive inputs from a vehicle user. Accordingly, the controller 34 is configured to receive inputs from the vehicle user via the user interface 23 and to provide an output (i.e., an alert) to the vehicle user.

The vehicle 10 may include one or more communication transceivers 37 in communication with the controller 34. Each of the communication transceivers 37 is configured to wirelessly communicate information to and from other remote entities, such as the remote vehicles, (through "V2V" communication), infrastructure (through "V2I" communication), remote systems at a remote call center (e.g., ON-STAR by GENERAL MOTORS), and/or personal electronic devices, such as a smart phone. The communication transceivers 37 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles may include one or more communication transceivers 37 as described above with respect to the vehicle 10.

The vehicle 10 includes one or more actuators 42 in communication with the controller 34. The actuators 42 control one or more vehicle features such as, but not limited to, a fuel injection system, one or more cam phasers, spark plugs, and a camshaft. The vehicle features may further include interior and/or exterior vehicle features such as, but are not limited to, doors, a trunk, and cabin features such as air, music, lighting, etc.

Figure 2:
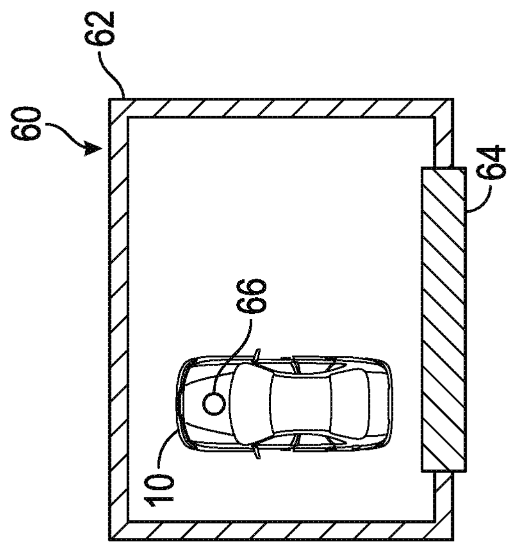
FIG. 2 is a schematic top view of the vehicle of FIG. 1 inside a parking garage.

With reference to FIGS. 1 and 2, the system 11 is configured to provide smart notifications to avoid collisions in a parking garage 60. As non-limiting examples, the term "parking garage" includes a home garage and other parking structures, such as tight parking spots or other parking locations. The parking garage 60 may include stationary structural walls 62 and a gate 64 movable relative to the stationary structural walls 62. The gate 64 may open to allow the vehicle 10 to enter or exit the parking garage 60. The controller 34 may receive sensor data from the sensors 40 to determine the current location 66 of the vehicle 10 inside the parking parage 60. The sensor data may therefore include current parked-vehicle data. The current parked-vehicle data is indicative that the vehicle 10 has been parked inside the parking garage 60 and includes the current location 66 (and the heading) of the vehicle 10 parked inside the parking garage 60. The current location 66 may be represented in center coordinates and orientation.

While parking inside the parking garage 60, the vehicle operator may collide with the stationary structural walls 62 (or other objects) of the parking garage 60. It is desirable to avoid such collisions. Some collision sensors, such as ultrasonic sensors and/or short-range radar, may not be capable of performing effectively in tight environments. Further, some approaches that are dependent on prior mapping of garages or parking structures may be too costly. It therefore desirable to develop a system 11 that provides a notification to a vehicle operator before a collision occurs without relying on real-time data from sensors 40 and/or mapping of parking garages 60 or other parking structures. As discussed below, the system 11 employs a learning process to learn the location where the vehicle 10 is properly parked based on historical parked-vehicle data. The historical parked-vehicle data includes information about where the vehicle 10 has been historically parked inside the parking garage 60. The system 11 then uses a probability distribution model that represents the proper parking area based on the historical parked-vehicle data. In addition, the system 11 identities one or more warning zones inside the parking parage 60. The warning zone is an area inside the parking garage 60 where the vehicle 10 has not been frequently parked in the past and may be determined using the historical parked-vehicle data.

With reference to FIGS. 3, 4, 5, and 6, FIG. 3 is a flowchart of a method 100 for creating a statistical representation of where the vehicle 10 has been historically and properly parked inside the parking garage 60. The method 100 also identifies unsafe parking zones (i.e., warning zones). The vehicle 10 is likely to collide with the stationary structural walls 62 and/or the gate 64 of the parking garage 60 when it is parked in the warning zone 74. The method 100 begins at block 102. At block 102, the system 11 tracks and saves the parked locations of the vehicle 10 inside the parking garage 60 in the past. To do so, the vehicle 10 may track its location inside the parking garages 60 using the sensors 40 and precise positioning processes, such as a simultaneous localization and mapping (SLAM). When the vehicle 10 drives away from a parking slot inside the parking garage 60, the last parked location is saved in the system 11. All the parking locations 66 inside the parking garage 60 over a predetermined number of days (e.g., 30 days) are saved in the system 11. It is envisioned that the parking garage 60 may have multiple parking spots, and the vehicle 10 may be parked in different locations. The vehicle 10 may be parked with its head or tail pointing toward into the parking garage 60 and away from the gate 64. Thus, at block 102, the controller 34 receives and saves the historical parked-vehicle data over a predetermined number of days (e.g., 30 days). The historical parked-vehicle data includes a plurality of historical parked locations 66 (and headings 70) inside the parking garage 60 over the predetermined number of days (e.g., 30 days) and may be crowdsourced from different remote vehicles. Next, the method 100 proceeds to block 104.

Figure 4:
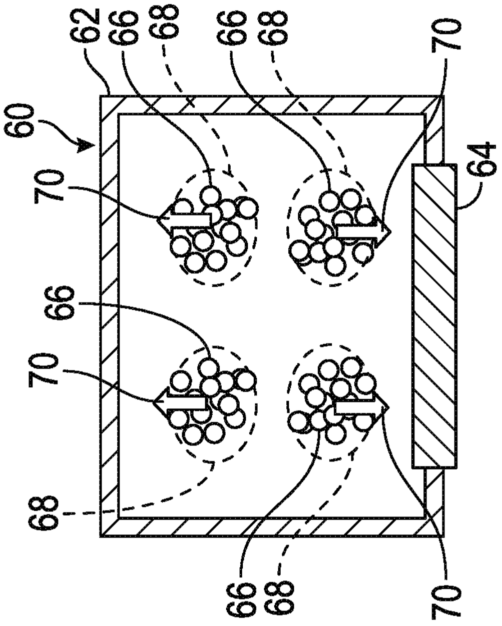
FIG. 4 is a schematic top view of the vehicle of FIG. 1 inside the parking garage, depicting a plurality of clusters.

At block 104, the controller 34 clusters the plurality of historical parked locations 66 inside the parking garage 60 over the predetermined number of days (e.g., 30 days) to generate one or more clusters 68. To analyze cases where the parking garage 60 can accommodate multiple vehicles 10, the controller 34 generates multiple clusters 68 in one parking garage 60 as shown in FIG. 4. A cluster 68 with a low number of parking locations 66 is considered as an outlier and discarded. Multiple variables may be used for clustering, such as, x, y, z, heading, etc. Various clustering algorithms may be used. As non-limiting examples, the controller 34 may use the K-means algorithm or the Density Based Spatial Clustering of Applications with Noise (DB-Scan) algorithm to cluster the plurality of historical parked locations 66. Each cluster 68 may be described by the heading 70 of the vehicle 10 (e.g., average heading of the plurality of historical parked locations 66 when the vehicle 10 is parked) and a cluster center (i.e., centroid o in FIG. 5). Then, the method 100 continues to block 106.

Figure 5:
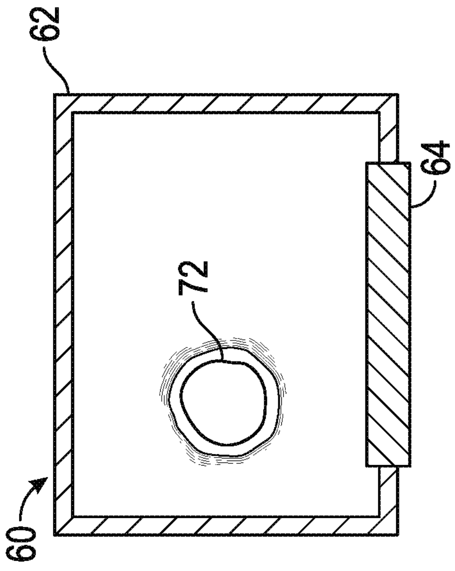
FIG. 5 is a schematic top view of the vehicle of FIG. 1 inside the parking garage, depicting a probability distribution.
Figure 6:
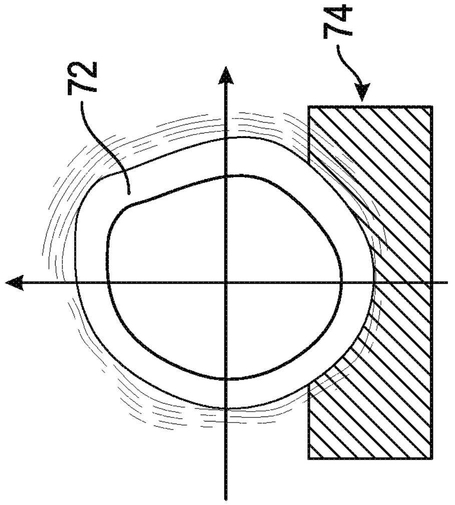
FIG. 6 is a graphical representation of the probability distribution of FIG. 5.

At block 106, the controller 34 creates a probability distribution 72 for each cluster 68 as shown in FIG. 5. As a non-limiting example, the controller 34 applies a Kernel Density Estimation (KDE) to the cluster 68 to generate the probability distribution 72. The probability distribution 72 represents how frequently the vehicle 10 is parked at a specific spot over the predetermined number of days (e.g., past 30 days). Next, the method 100 continues to block 108.

At block 108, the controller 34 determines the warning zones using the historical parked-vehicle data and a cumulative distribution function. As shown in FIG. 5, the centroid o (FIG. 6) of the cluster 68 (FIG. 4) is at the center of a local coordinate system. In this local coordinate system, x points toward the right side of the vehicle 10, and y points toward the average heading 70 (FIG. 4) of the vehicle 10. To determine the warning zone 74, a line P is drawn. The line P is orthogonal to axis y and intersects axis y at point (0,p). The area below line P is the rear warning zone 74. Similarly, P lines may be drawn to determine the front, left, and right warning zones. The probability that the vehicle 10 is parked in the warning zone 74 is expressed by the following equation:

$$P_w(p) = \frac{\int\int_{x\in U, y<p} pdf(x, y)dxdy}{\int\int_{x\in U, y\in U} pdf(x, y)dxdy} \quad \text{Eq. 1}$$

where:

$P_w(p)$ is a function of p and is the probability that the vehicle 10 will be parked in the warning zone 74;

p is the intersection point between the warning zone 74 and the axis y;

pdf is a probability distribution function;

x is the horizontal axis in the local coordinate system centered at centroid o;

y is the vertical axis in the local coordinate system centered at centroid o; and U is the maximum limit.

A predetermined system threshold, $P_{threshold}$, such as 10%, p can be calculated using the following equation:

$$p = P_2^{-1}(P_{threshold})_w \quad \text{Eq. 2}$$

where:

p is the intersection point between the warning zone 74 and the axis y;

$P_{threshold}$ is the predetermined system threshold for the warning zone 74; and P is the probability that the vehicle 10 will be parked in the warning zone 74.

The warning zone 74 represents an area where the vehicle 10 is not frequently parked. This implies that this might not be a safe spot to park in the warning zone 74, especially in a narrow parking space.

FIG. 7 is a method 200 for providing smart notifications to avoid collisions in the parking garage 60. The method 200 begins at block 202. At block 202, the vehicle 10 is parked inside the parking garage 60. As discussed above, the parking garage 60 may be a home garage or a public parking structure. At this point, the controller 34 receives current parked-vehicle data from the sensors 40 of the vehicle 10. The current parked-vehicle data indicates that the vehicle 10 has been parked inside the parking garage 60. The current parked-vehicle data also includes the current location of the vehicle 10 parked inside the parking garage 60. Then, the method 200 continues to block 204.

At block 204, the controller 34 determines whether the current location of the vehicle 10 inside the parking garage 60 is inside or outside the warning zone 74. If the vehicle 10 is parked outside the warning zone 74, then the method 200 proceeds to block 206. At block 206, the controller 34 saves the last current location of the vehicle 10 inside the parking garage 60 (i.e., the new parked location) and updates the probability distribution 72 with the latest parked location. If the vehicle 10 is parked partly or entirely inside the warning zone 74, then the method 200 proceeds to block 208. At block 208, the controller 34 commands the user interface 23 to generate an notification (e.g., an audible and/or visible notification) to warn the vehicle operator that the vehicle 10 should be moved to another parking spot in the parking garage 60, because the current location of the vehicle 10 is not an appropriate parking spot. As discussed above, it is more likely that the vehicle 10 will collide with the stationary structural walls 62 and/or gate 64 of the parking garage 60 when the vehicle 10 is parked inside the warning zone 74. Then, the method 200 continues to block 210.

At block 210, the vehicle operator moves the vehicle 10 to a location outside the warning zone 74. Alternatively, the controller 34 commands the vehicle 10 to autonomously move to a location outside the warning zone 74. Then, the method 200 proceeds to block 206.

Figure 8:
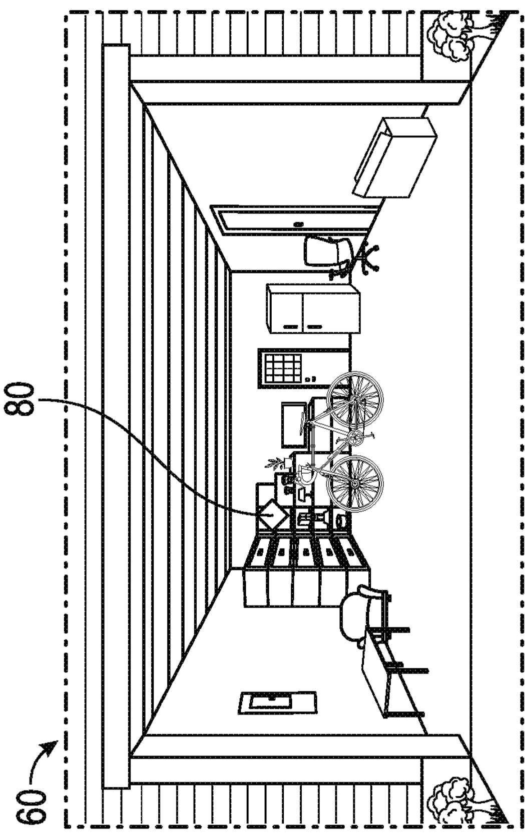
FIG. 8 is a graphical representation of a location outside the warning zone on a heads-up display of the vehicle of FIG. 1.

With reference to FIG. 8, while the vehicle 10 is being parked inside the parking garage 60, the controller 34 may command the HUD 43 to virtually display a graphic representation 80 of a location outside the warning zone 74 or just at the boundary of the warning zone 74.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for generating garage parking notifications, comprising:

receiving current parked-vehicle data indicating that a vehicle has been parked inside a garage, wherein the current parked-vehicle data includes a current location of the vehicle parked inside the garage;

determining whether the current location of the vehicle inside the garage is within a warning zone, wherein the warning zone is an area inside the garage where the vehicle has not been frequently parked, and the warning zone is determined using historical parked-vehicle data;

in response to determining that the current location of the vehicle inside the garage is within the warning zone, generating a notification to warn a vehicle operator that the vehicle should be moved to another parking spot in the garage;

determining that the vehicle has moved within the garage after generating the notification to warn the vehicle operator of the vehicle;

determining a new parked location of the vehicle inside the garage after the vehicle has moved;

saving the new parked location of the vehicle;

determining the warning zone using the historical parked-vehicle data, wherein the historical parked-vehicle data includes information about where the vehicle has been historically parked inside the garage; and wherein determining the warning zone includes:

receiving the historical parked-vehicle data, wherein the historical parked-vehicle data includes a plurality of historical parked locations inside the garage; and clustering the plurality of historical parked locations inside the garage to generate a cluster; and wherein determining the warning zone includes applying a Kernel Density Estimation (KDE) to the cluster to generate a probability distribution.

2. The method of claim 1, wherein determining the warning zone includes using a cumulative distribution function to determine the warning zone.

3. The method of claim 2, further comprising virtually displaying a graphical representation of a location outside the warning zone on a heads-up display.

4. A tangible, non-transitory, machine-readable medium, comprising machine-readable instructions, that when executed by a processor, cause the processor to:

receive current parked-vehicle data indicating that a vehicle has been parked inside a garage, wherein the current parked-vehicle data includes a current location of the vehicle inside the garage;

determine whether the current location of the vehicle inside the garage is within a warning zone, wherein the warning zone is an area inside the garage where the vehicle has not been frequently parked, and the warning zone is determined using historical parked-vehicle data;

in response to determining that the current location of the vehicle inside the garage is within the warning zone, generate a notification to warn a vehicle operator of the vehicle that the vehicle should be moved;

determine that the vehicle has moved within the garage after generating the notification to warn the vehicle operator of the vehicle;

determine a new parked location of the vehicle inside the garage after the vehicle has moved;

save the new parked location of the vehicle;

determine the warning zone using the historical parked-vehicle data, wherein the historical parked-vehicle data includes information about where the vehicle has been parked inside the garage;

receive the historical parked-vehicle data, wherein the historical parked-vehicle data includes a plurality of historical parked locations inside the garage; and cluster the plurality of historical parked locations inside the garage to generate a cluster; and apply a Kernel Density Estimation (KDE) to the cluster to generate a probability distribution.

5. The tangible, non-transitory, machine-readable medium of claim 4, wherein the tangible, non-transitory, machine-readable medium, further comprising machine-readable instructions, that when executed by the processor, causes the processor to:

use a cumulative distribution function to determine the warning zone.

6. The tangible, non-transitory, machine-readable medium of claim 4, wherein the tangible, non-transitory, machine-readable medium, further comprising machine-readable instructions, that when executed by the processor, causes the processor to:

command a heads-up display to virtually display a graphical representation of a location outside warning zone.

7. A system, comprising:

a plurality of sensors;

a controller in communication with the plurality of sensors, wherein the controller is programmed to:

receive current parked-vehicle data from at least one of the plurality of sensors, wherein the current parked-vehicle data indicates that a vehicle has been parked inside a garage, and the current parked-vehicle data includes a current location of the vehicle inside the garage;

determine whether the current location of the vehicle inside the garage is within a warning zone, wherein the warning zone is an area inside the garage where the vehicle has not been frequently parked, and the warning zone is determined using historical parked-vehicle data; and in response to determining that the current location of the vehicle inside the garage is within the warning zone, generate a notification to warn a vehicle operator of the vehicle that the vehicle should be moved;

determine that the vehicle has moved within the garage after generating the notification to warn the vehicle operator of the vehicle;

determine a new parked location of the vehicle inside the garage after the vehicle has moved;

save the new parked location of the vehicle;

determine the warning zone using the historical parked-vehicle data, wherein the historical parked-vehicle data includes information about where the vehicle has been parked inside the garage;

receive the historical parked-vehicle data, wherein the historical parked-vehicle data includes a plurality of historical parked locations inside the garage;

cluster the plurality of historical parked locations inside the garage to generate a cluster; and apply a Kernel Density Estimation (KDE) to the cluster to generate a probability distribution.

8. The system of claim 7, wherein the controller is programmed to use a cumulative distribution function to determine the warning zone.

* * * * *